(12) United States Patent
Larsson et al.

(10) Patent No.: US 8,704,120 B2
(45) Date of Patent: Apr. 22, 2014

(54) DEVICE FOR HANDLING POWDER FOR A WELDING APPARATUS

(75) Inventors: Rolf Gösta Larsson, Laxå (SE); Björn Johansson, Mullhyttan (SE)

(73) Assignee: ESAB AB, Gothenburg (SE)

( * ) Notice: Subject to any disclaimer, the term of this patent is extended or adjusted under 35 U.S.C. 154(b) by 221 days.

(21) Appl. No.: 12/992,818

(22) PCT Filed: Jun. 11, 2009

(86) PCT No.: PCT/SE2009/050715
§ 371 (c)(1),
(2), (4) Date: Jan. 5, 2011

(87) PCT Pub. No.: WO2010/002328
PCT Pub. Date: Jan. 7, 2010

(65) Prior Publication Data
US 2011/0089144 A1    Apr. 21, 2011
US 2012/0097643 A9    Apr. 26, 2012

(30) Foreign Application Priority Data
Jul. 3, 2008    (SE) ...................................... 0801589

(51) Int. Cl.
*B23K 9/32*    (2006.01)
(52) U.S. Cl.
USPC .................... 219/73.2; 219/76.11; 219/76.12; 219/76.13; 219/76.14; 219/76.15; 219/76.16; 219/76.17; 219/74; 110/106
(58) Field of Classification Search
USPC ............ 219/76.1, 76.11, 76.12, 76.13, 76.14, 219/76.15, 76.16, 76.17, 73, 74, 73.2; 427/446–456; 110/106
See application file for complete search history.

(56) References Cited

U.S. PATENT DOCUMENTS

| | | | | |
|---|---|---|---|---|
| 2,727,125 A * | 12/1955 | Muller | ............................. | 219/74 |
| 2,851,581 A * | 9/1958 | Libby | ............................. | 219/74 |
| 2,934,632 A * | 4/1960 | Todd | ............................. | 219/73.2 |
| 2,947,847 A * | 8/1960 | Craig et al. | ...................... | 219/74 |
| 3,016,447 A * | 1/1962 | Gage et al. | ................... | 219/76.15 |

(Continued)

FOREIGN PATENT DOCUMENTS

| CN | 85108557 A | 6/1986 |
|---|---|---|
| CN | 2129665 Y | 4/1993 |

(Continued)

OTHER PUBLICATIONS

International Search Report for PCT/SE2009/050715, dated Oct. 5, 2009.

*Primary Examiner* — Henry Yuen
*Assistant Examiner* — Jimmy Chou
(74) *Attorney, Agent, or Firm* — Kacvinsky Daisak Bluni PLLC

(57) ABSTRACT

A welding device for powder welding is described, which comprises a welding head for transportation of at least one welding electrode to a welding area, and a powder transportation device for transportation of powder from a container to the welding area. The powder transportation device comprises at least a first pipe which at a first end has an opening which is arranged to be placed in the container in order to transport fluxing agent from the container. The powder transportation device comprises at least a first ejector which is connected to the second end of the first pipe and which is arranged to transport powder from the container via the first pipe using pressurized gas.

16 Claims, 2 Drawing Sheets

(56) References Cited

U.S. PATENT DOCUMENTS

Figure 1:
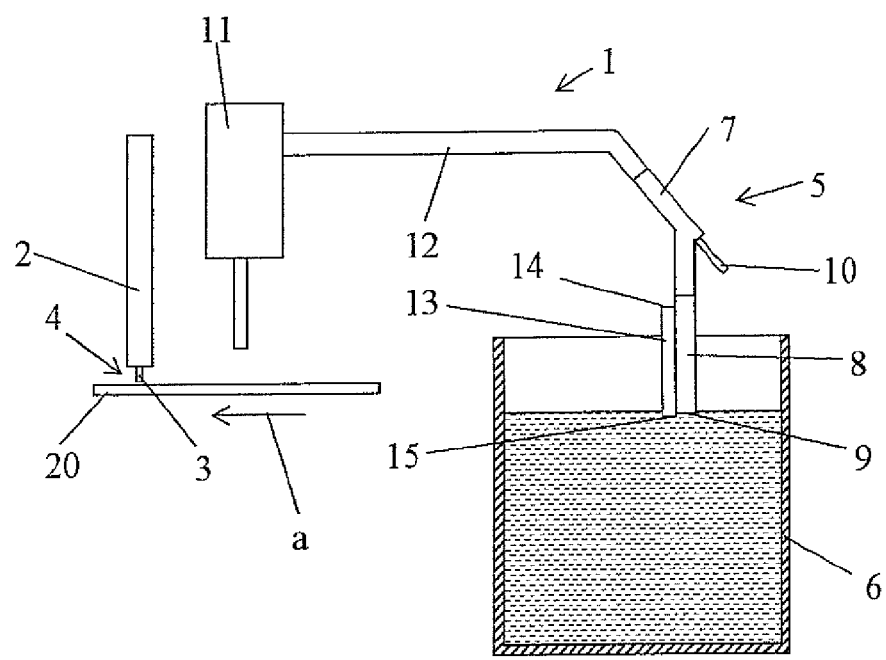

| | | | | |
|---|---|---|---|---|
| 3,023,301 A * | 2/1962 | Claussen | | 219/74 |
| 3,995,073 A * | 11/1976 | Kuonen et al. | | 427/10 |
| 4,097,711 A * | 6/1978 | Banerjee | | 219/76.15 |
| 4,131,072 A * | 12/1978 | Lingl et al. | | 110/106 |
| 4,221,957 A * | 9/1980 | Barger et al. | | 219/73.2 |
| 4,237,361 A * | 12/1980 | Zwintscher et al. | | 219/76.1 |
| 4,259,911 A * | 4/1981 | Jones | | 110/245 |
| 4,269,867 A * | 5/1981 | Altorfer et al. | | 427/564 |
| 4,278,240 A * | 7/1981 | Archenholtz | | 266/216 |
| 4,300,474 A * | 11/1981 | Livsey | | 118/641 |
| 4,302,483 A * | 11/1981 | Altorfer et al. | | 427/564 |
| 4,414,459 A * | 11/1983 | Sims et al. | | 219/73.2 |
| 4,570,047 A * | 2/1986 | Vislosky | | 219/73 |
| 4,576,526 A * | 3/1986 | Muller et al. | | 406/75 |
| 4,612,045 A * | 9/1986 | Shintaku | | 423/412 |
| 4,613,741 A * | 9/1986 | Arnoldy | | 219/73.2 |
| 4,627,990 A * | 12/1986 | Saga et al. | | 427/10 |
| 4,723,060 A * | 2/1988 | Arnoldy | | 219/73.2 |
| 4,730,093 A * | 3/1988 | Mehta et al. | | 219/121.63 |
| 4,732,778 A * | 3/1988 | Kawasaki | | 427/597 |
| 4,743,733 A * | 5/1988 | Mehta et al. | | 219/121.66 |
| 4,746,540 A * | 5/1988 | Kawasaki et al. | | 427/597 |
| 4,853,515 A * | 8/1989 | Willen et al. | | 219/121.47 |
| 4,937,417 A * | 6/1990 | Fox | | 219/76.1 |
| 5,021,149 A * | 6/1991 | Geisseler | | 209/141 |
| 5,047,612 A * | 9/1991 | Savkar et al. | | 219/121.47 |
| 5,182,430 A * | 1/1993 | Lagain | | 219/121.63 |
| 5,245,155 A * | 9/1993 | Pratt et al. | | 219/121.63 |
| 5,303,141 A * | 4/1994 | Batchelder et al. | | 700/29 |
| 5,344,231 A * | 9/1994 | Jonsson et al. | | 366/137 |
| 5,408,066 A * | 4/1995 | Trapani et al. | | 219/121.47 |
| 5,477,025 A * | 12/1995 | Everett et al. | | 219/121.84 |
| 5,486,676 A * | 1/1996 | Aleshin | | 219/121.63 |
| 5,556,560 A * | 9/1996 | Ahola et al. | | 219/121.45 |
| 5,579,107 A * | 11/1996 | Wright et al. | | 356/336 |
| 5,603,853 A * | 2/1997 | Mombo-Caristan | | 219/121.64 |
| 5,717,599 A * | 2/1998 | Menhennett et al. | | 700/118 |
| 5,726,419 A * | 3/1998 | Tabata et al. | | 219/130.51 |
| 5,837,960 A * | 11/1998 | Lewis et al. | | 219/121.63 |
| 6,001,426 A * | 12/1999 | Witherspoon et al. | | 427/449 |
| 6,005,215 A * | 12/1999 | Boyd et al. | | 219/76.14 |
| 6,258,402 B1 * | 7/2001 | Hussary et al. | | 427/142 |
| 6,265,689 B1 * | 7/2001 | Fusaro, Jr. | | 219/121.47 |
| 6,322,856 B1 * | 11/2001 | Hislop | | 427/446 |
| 6,498,321 B1 * | 12/2002 | Fulmer et al. | | 219/130.33 |
| 6,610,368 B2 * | 8/2003 | Schmitz et al. | | 427/447 |
| 6,791,056 B2 * | 9/2004 | VanOtteren et al. | | 219/86.1 |
| 6,833,529 B2 * | 12/2004 | Ueyama et al. | | 219/130.21 |
| 6,861,101 B1 * | 3/2005 | Kowalsky et al. | | 427/455 |
| 6,881,919 B2 * | 4/2005 | Pyritz et al. | | 219/76.1 |
| 7,342,196 B2 * | 3/2008 | Koenig | | 219/121.47 |
| 7,358,457 B2 * | 4/2008 | Peng et al. | | 219/121.63 |
| 7,434,601 B2 * | 10/2008 | Kraus et al. | | 141/85 |
| 7,708,504 B2 * | 5/2010 | Heckendorn et al. | | 406/152 |
| 7,836,572 B2 * | 11/2010 | Mons et al. | | 29/458 |
| 7,959,870 B2 * | 6/2011 | Yanokuchi et al. | | 422/219 |
| 7,992,760 B2 * | 8/2011 | Wilks | | 228/42 |
| 8,067,711 B2 * | 11/2011 | Blankenship et al. | | 219/121.4 |
| 8,203,095 B2 * | 6/2012 | Storm et al. | | 219/121.47 |
| 2004/0134518 A1* | 7/2004 | Kraus et al. | | 134/18 |
| 2010/0006297 A1* | 1/2010 | Stave | | 166/335 |

FOREIGN PATENT DOCUMENTS

| | | | |
|---|---|---|---|
| CN | 1277903 A | | 12/2000 |
| GB | 788535 | * | 12/1955 |
| GB | 785601 A | | 10/1957 |
| GB | 788535 A | | 1/1958 |
| GB | 1339938 A | | 12/1973 |
| JP | 58-100974 A1 | | 6/1983 |
| JP | 04-075918 A1 | | 3/1992 |
| JP | 6-80739 A1 | | 3/1994 |
| JP | 06-083170 A1 | | 3/1994 |
| JP | 06-229370 A1 | | 8/1994 |
| SU | 1181815 A | | 9/1985 |
| SU | 1382617 A1 | | 3/1988 |

\* cited by examiner

DEVICE FOR HANDLING POWDER FOR A WELDING APPARATUS

TECHNICAL FIELD

The present invention relates to a device and a method for handling powder for a welding apparatus for powder welding. More specifically, the present invention relates to a device and a method for transfer of powder from a container to a welding area in powder welding.

DESCRIPTION OF THE PRIOR ART

The present invention relates to powder welding which is a well known welding technique in which a flux compound in powder form is applied to a surface on which welding is to be performed. At least one welding electrode is moved to the surface where the powder has been applied and a voltage is applied between said at least one welding electrode and the surface. It is desirable that the welding may be performed under powder within the entire welding area.

In present welding installations for powder welding, which are adapted for welding with a large speed a lot of powder is consumed per time unit. The present welding installations comprise at least one container for powder where new powder is mixed with used powder which has not been consumed during the welding. From the container the flux compound is alternately transported to a first and a second pressure container. From the pressure containers the powder is transported using compressed air to a drop release container from which the welding powder falls down on the welding area. When the first pressure container is partly emptied the pressure container, from which fluxing agent is transported to the drop release container, is exchanged from the first pressure container to the second pressure container. At the same time as fluxing agent is transported from the first pressure container to the drop release container, fluxing agent is filled into the second pressure container and vice versa. Another problem with the present welding installations is that the equipment in the form of pressure containers and other for transfer of powder from the reservoir to the drop release container is complicated, expensive and troublesome to install and handle. Furthermore, during use of pressure vessels various regulations regarding pressure vessels must be fulfilled. Transfer using pressure containers according to the above has been used within the welding industry since the 1950s.

SUMMARY OF THE INVENTION

An object of the present invention is to provide a welding device for powder welding and a method for handling powder which at least partly solves some of the problems with the prior art.

At least one of these objects is fulfilled with a welding device and a method according to the appended independent claim.

Further advantages with the invention are achieved with the features in the dependent claims.

A basic idea with the present invention is to use an ejector to transport fluxing agent in powder form from a container to a welding area. Ejectors are well known for use in other applications since before and are based on the principle that pressurized gas is pressed through a nozzle, wherein the gas surrounding the nozzle is transported with the pressurized gas.

According to a first aspect of the invention a welding device is provided for powder welding, which comprises a welding head for transportation of at least one welding electrode to a welding area, and a powder transportation device for transportation of powder from a container to the welding area, wherein the powder transportation device comprises at least a first pipe which in a first end has an opening which is arranged to be placed in the container to transport powder from the container. The welding device is characterized in that the powder transportation device comprises at least a first ejector which is connected to the second end of the first pipe and which is arranged to transport powder from the container via the first pipe using pressurized gas. An air supply pipe is arranged with one of its openings adjacent to the opening in the first end of the first pipe for transportation of air to the opening of the first pipe. In this way air supply is secured to the first pipe and the problems with bad suction due to the air flow being too low is thereby avoided.

With a powder transportation device according to the invention suction of welding powder directly from a transportation container is enabled. This facilitates the powder handling compared to when devices according to the prior art are used.

The powder transportation device may comprise a drop release container from which powder is arranged to fall down on the welding area, and wherein the first ejector is arranged to transport powder from the first container towards the drop release container. With such a drop release container a more even transfer of fluxing agent in powder form to the welding area is achieved than what is otherwise possible.

The first ejector may comprise an inlet, an outlet, and wherein the powder transportation device comprises a second pipe which is arranged fixed in the outlet of the first ejector and arranged to transport powder from the first ejector, wherein the second end of the first pipe is arranged fixed in the inlet of the first ejector. The ejector is preferably arranged adjacent to the container for fluxing agent so that the distance which fluxing agent has to be sucked is kept relatively short.

The inlet of the first ejector may define an inlet direction and the outlet of the first ejector may define an outlet direction, wherein the inlet direction forms an angle with the outlet direction. By arranging the outlet direction at an angle with the inlet direction the supply of pressurized gas to the orifice is facilitated. It is of course possible within the scope of the invention to let the inlet direction be parallel to the outlet direction.

The first pipe and the inlet of the ejector may have an inner diameter in the interval 5-100 mm, preferably in the interval 10-50 mm and most preferred in the interval 15-30 mm. In the corresponding way the outlet of the ejector and the second pipe may have an inner diameter in the interval 5-100 mm, preferably 10-50 mm and most preferred 15-30 mm. Said inner diameters have proven to give a satisfactory result during transport of fluxing agent in powder form.

The first ejector may comprise an opening which is arranged to blow pressurized gas in the direction towards the outlet of the ejector. It is not necessary for the opening to be directed directly towards the outlet of the ejector.

The orifice of the ejector for pressurized gas may have an inner diameter in the interval 2-50% of the inner diameter of the outlet of the ejector, preferably 5-20% of the inner diameter of the outlet of the ejector.

The orifice for pressurized gas may be centred in relation to the outlet of the ejector. Such a placement has proved to be advantageous for the function of the ejector.

The welding device may comprise at least one further ejector besides the first ejector, wherein also the at least one further ejector is arranged between the first container and the welding area. This may be necessary if the distance between the first container and the welding are is large.

In the following preferred embodiments of the invention will be described with reference to the appended drawings.

SHORT DESCRIPTION OF THE DRAWINGS

FIG. 1 shows schematically a welding device according an embodiment of the present invention.

Figure 2:
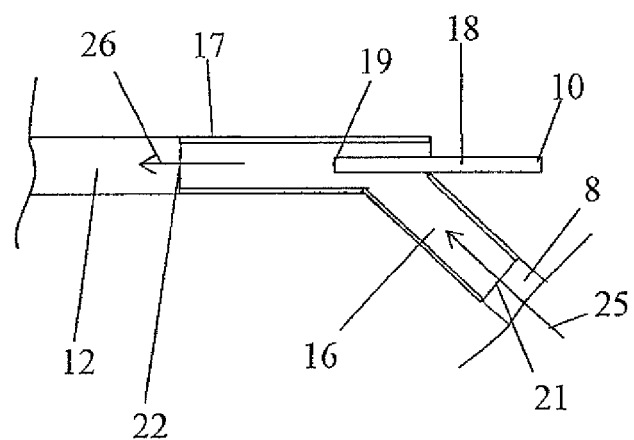

In FIG. 2 the ejector 7 is shown in larger detail in cross-section.

Figure 3:
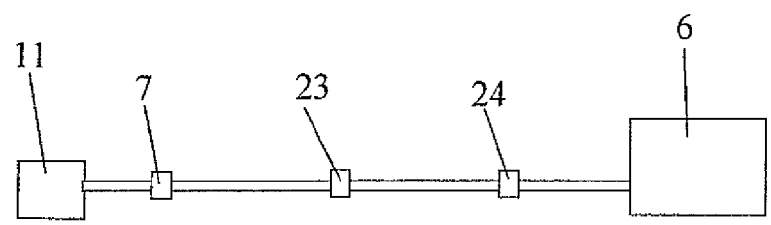

FIG. 3 shows schematically a welding device according to an alternative embodiment.

DESCRIPTION OF PREFERRED EMBODIMENTS OF THE INVENTION

In the following description of preferred embodiments of the invention similar parts in different figures will be denoted by the same reference numeral.

FIG. 1 shows schematically a welding device 1 for powder welding according to an embodiment of the present invention. The welding device 1, comprises a welding head 2, for feeding at least one welding electrode 3 to a welding area 4 on a work piece 20, and a powder transportation device 5 for transportation of fluxing agent in powder form from a container 6 to the welding area 4. The powder transportation device 5 comprises an ejector 7 and a first pipe 8, which in a first end has an opening 9 which is arranged to be placed in the container to transport powder from the container 6, and which in the second end is connected to the ejector 7. The powder transportation device comprises also a drop release container 11 and a second pipe 12 which is arranged between the ejector 7 and the drop release container 11. The ejector 7 is arranged to transport fluxing agent in powder form from the container 6 via the first pipe 8, the ejector 7 and the second pipe 12 to the drop release container, using pressurized gas. The fluxing agent is arranged to fall down on the welding area 4 from the drop release container. To this end, the ejector 7 comprises an inlet 10 for pressurized gas. The pressurized gas may be provided in any of many different ways such as for example by means of a compressor. In FIG. 1 no source for the pressurized gas is shown. The powder transportation device 5 also comprises an air supply pipe 13 which is arranged with a first opening 14 in the air surrounding the container 6 and a second opening 15 which is arranged adjacent to the opening 9 of the first pipe 8. The air supply device 13 may be arranged in other ways than what is shown in FIG. 1. It is for example possible to let the air supply pipe surround the first pipe 8.

In FIG. 2 the ejector 7 is shown in larger detail in cross-section. The ejector 7 comprises a first pipe portion 16 which is connected to the first pipe 8, and a second pipe portion 17 which is connected to the second pipe 12. The ejector has an inlet 21 with an inlet direction 25 and an outlet 22 with an outlet direction 26. The inlet 10 for pressurized gas continues in an ejector pipe 18 with an orifice 19 which is essentially centred in relation to the second pipe portion 17. The first pipe 8, the second pipe 12, the first pipe portion 16, the second pipe portion 17 and thus also the inlet 21 and the outlet 22 of the ejector have inner diameters in the interval 5-100 mm, preferably in the interval 10-50 mm and most preferred in the interval 15-30 mm. The orifice 19 of the ejector pipe 18 has an inner diameter in the interval 2-50% of the inner diameter of the second pipe, preferably 5-20% of the inner diameter of the second pipe. It is of course possible to arrange the ejector pipe 18 and its orifice 19 in other ways than those that are shown in the figure.

During operation of a welding installation according to the described embodiment pressurized gas such as for example pressurized air is blown in through the inlet 10 and out through the ejector pipe 18, wherein the air that surrounds the ejector pipe will be put in motion. Thereby an air stream is created from the container 6 through the first pipe 8, the ejector 7 and the second pipe 12 to the drop release container 11. Powder will be transported with the air stream from the container 6 to the drop release container 11. In order to secure sufficient air supply to the first pipe 8 an air supply pipe 13 is arranged with a first opening 14 in the air surrounding the container 6 and a second opening 15 which is arranged adjacent to the opening 9 of the first pipe 8. After the powder has reached the drop release container 11 the powder falls down on the welding area 4 on a work piece 20. The work piece 20 is moved in the direction of the arrow a during welding so that powder is applied on the welding area 4 before welding is performed.

FIG. 3 shows schematically a welding device according to an alternative embodiment. In FIG. 3 the distance between the container 6 and the drop release container 11 is sufficiently large that also a second ejector 23 and a third ejector 24 are necessary to reliably be able to transport powder from the container 6 to the drop release container 11.

The pipes from and to the ejectors are preferably hoses as any stops in the pipes then easier may be attended to by for example shaking the hoses.

The described embodiments may be varied in many ways without departing from the spirit and scope of the invention which is limited only by the appended claims.

It is of course possible to arrange an arbitrary number of ejectors between the container 6 and the drop release container 11.

The invention claimed is:

1. Welding device for powder welding, comprising a welding head for transportation of at least one welding electrode to a welding area, and a powder transportation device for transportation of powder from a container to the welding area, wherein the powder transportation device comprises:
    a first pipe having a first end extending into a top of the container, the first end having an opening for receiving powder from the container,
    a first ejector connected to a second end of the first pipe and arranged to produce an air stream for drawing powder out of the top of the container via the first pipe, using pressurized gas, and
    an air supply pipe arranged with one of its openings adjacent to the opening in the first end of the first pipe for supplying air to the opening of the first pipe,
    wherein the first ejector comprises an inlet, an outlet, and wherein the powder transportation device comprises a second pipe which is arranged fixed in the outlet of the first ejector and arranged to transport powder from the first ejector, wherein the second end of the first pipe is arranged fixed in the inlet of the first ejector.

2. Welding device according to claim 1, wherein the powder transportation device further comprises a drop release container from which powder is arranged to fall down on the welding area, and wherein the first ejector is arranged to transport powder from the first container towards the drop release container.

3. Welding device according to claim 1, wherein the inlet of the first ejector defines an inlet direction and the outlet of the first ejector defines an outlet direction, and wherein the inlet direction forms an angle with the outlet direction.

4. Welding device according to claim 1, wherein the first pipe has an inner diameter in the interval 5-100 mm.

5. Welding device according to claim 1, wherein the first ejector comprises an orifice which is arranged for blowing pressurized gas in the direction towards the outlet of the first ejector.

6. Welding device according to claim 5, wherein the orifice of the first ejector for pressurized gas has an inner diameter in the interval 2-50% of an inner diameter of the second pipe, preferably 5-20% of the inner diameter of the second pipe.

7. Welding device according to claim 1, which comprises at least one further ejector in addition to the first ejector wherein also said at least one further ejector is arranged between the container and the welding area.

8. Welding device according to claim 4, wherein the first pipe has an inner diameter in the interval 10-50 mm.

9. Welding device according to claim 4, wherein the first pipe has an inner diameter in the interval 15-30 mm.

10. A powder transportation device for transportation of powder from a container to a welding area, the powder transportation device comprising:
   a first pipe having a first end with an opening arranged to receive powder from the container,
   a first ejector having an inlet and an outlet, a second end of the first pipe disposed adjacent the inlet of the first ejector, the second end of the first pipe arranged to produce an air stream which draws powder out of a top of the container via the first pipe using pressurized gas,
   a second pipe disposed adjacent the outlet of the first ejector, the second pipe arranged to transport powder from the first ejector, and
   an air supply pipe arranged to supply air to the opening of the first pipe.

11. The powder transportation device according to claim 10, further comprising a drop release container from which powder is arranged to fall down on the welding area, wherein the first ejector is arranged to transport powder from the first container to the drop release container.

12. The powder transportation device according to claim 10, wherein the inlet of the first ejector defines an inlet direction and the outlet of the first ejector defines an outlet direction, wherein the inlet direction forms an angle with the outlet direction.

13. The powder transportation device according to claim 10, wherein the first pipe has an inner diameter in the interval 5-100 mm.

14. The powder transportation device according to claim 10, wherein the first ejector includes an orifice arranged to expel pressurized gas in the direction of the outlet of the first ejector.

15. The powder transportation device according to claim 14, wherein the orifice of the first ejector for pressurized gas has an inner diameter in the interval 2-50% of an inner diameter of the second pipe, preferably 5-20% of the inner diameter of the second pipe.

16. The powder transportation device according to claim 10, further comprising a second ejector arranged between the container and the welding area.

* * * * *